March 27, 1934.  H. H. WESTINGHOUSE  1,952,345
FLUID PRESSURE BRAKE
Filed Nov. 8, 1929
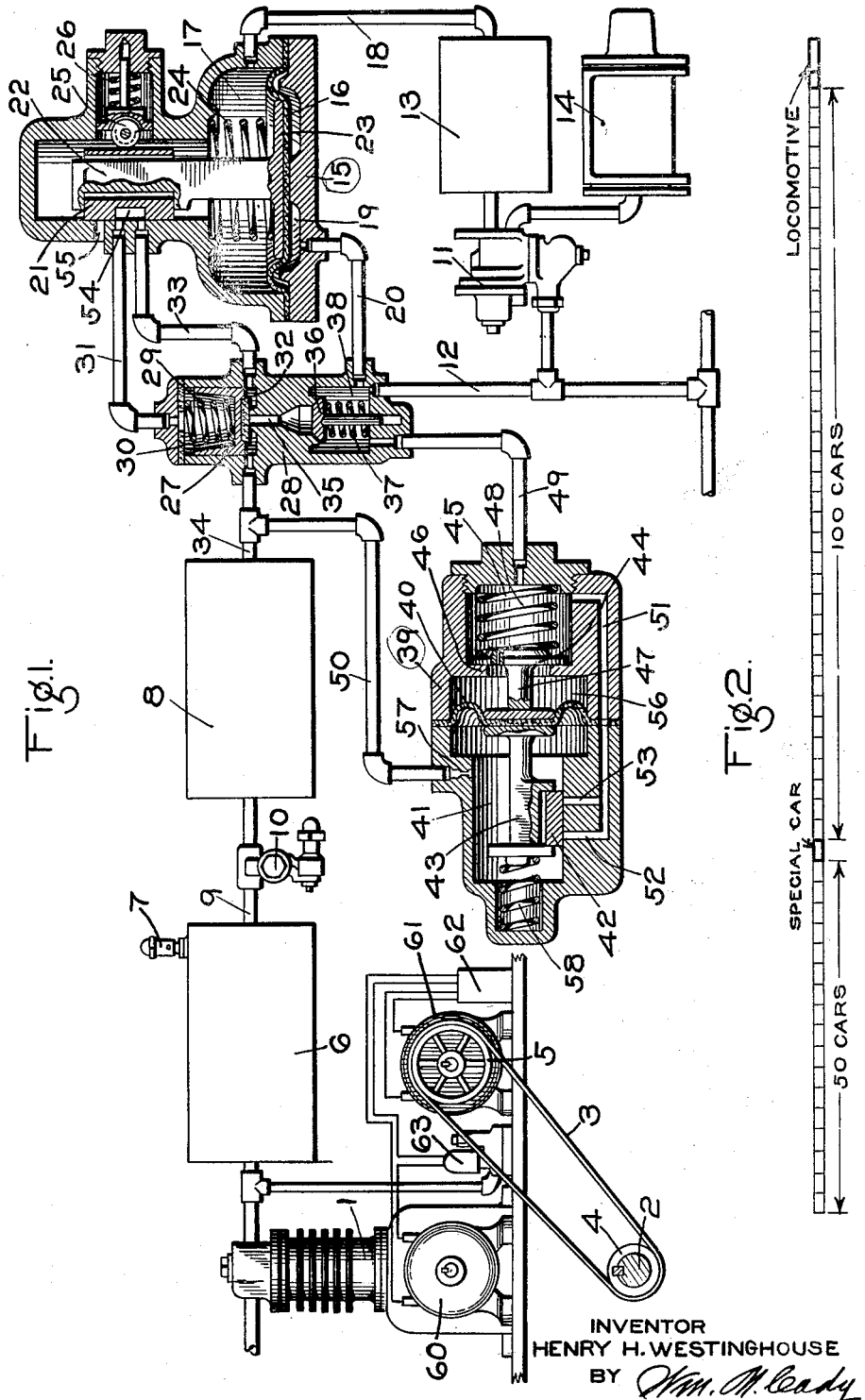
INVENTOR
HENRY H. WESTINGHOUSE
BY Wm. M. Cady
ATTORNEY Patented Mar. 27, 1934

1,952,345

UNITED STATES PATENT OFFICE 1,952,345

FLUID PRESSURE BRAKE

Henry H. Westinghouse, New York, N. Y., assignor to The Westinghouse Air Brake Company, Wilmerding, Pa., a corporation of Pennsylvania Application November 8, 1929, Serial No. 405,648

9 Claims. (Cl. 303—66)

This invention relates to fluid pressure brakes, and more particularly to a fluid pressure brake system for railway trains.

For the purpose of economy, there is a continuing tendency to increase the number of freight cars in a train and where heretofore a freight train might consist of 100 cars, there are now trains being operated which include up to 150 cars.

With the increase in the length of the train, the train brake pipe of the fluid pressure brake system is correspondingly increased in length and although the fluid pressure brake equipment has been improved from time to time so as to successfully handle longer and longer trains, the continued increase in the length of the train and the brake pipe correspondingly increases the operating difficulties in the control of the brakes.

One such difficulty arises from the increased length of time required to obtain approximately the full working pressure in the fluid pressure brake system on the rear cars of a very long train, it being necessary, with the present fluid pressure brake system, to supply the compressed fluid solely from the locomotive, through the usual brake pipe. The above condition results in a partial reduction in brake efficiency and also causes certain operating difficulties.

It might be possible to further improve the fluid pressure brake equipment employed on cars, so as to obviate the difficulty referred to, but this would necessitate equipping all cars in service with an improved fluid pressure brake equipment, which would involve great expense and which would require considerable time to install.

According to one feature of my invention, a special car or caboose is equipped with an apparatus by which a supply of fluid under pressure is generated and maintained on the special car independently of the brake pipe, and means are provided for supplying fluid under pressure to the brake pipe from the storage reservoir on the special car at the desired time. The special car or caboose is preferably located at an intermediate position in the train, such as, for example, one-third of the train length forward from the rear end of the train.

Other objects and advantages will appear in the following more detailed description of the invention.

In the accompanying drawing; Figure 1 is a diagrammatic view, partly in section, of a brake apparatus embodying my invention; and Fig. 2 a diagram illustrating the location of the special car in a train of cars.

According to a preferred form of my invention, a fluid compressor 1 of any suitable design is installed on the caboose or special vehicle and preferably the compressor may be operated by an electric motor 60. An electric generator 61 is provided having an operating pulley 5, and on an axle 2 of the vehicle is secured a pulley 4. The pulleys 4 and 5 are connected by a driving belt 3, so that when the vehicle is running along the track, the generator is operated to generate electric current.

Current generated by the generator 61 is employed to charge storage batteries 62 and current from the storage batteries is employed to operate the electric motor 60. The compressor 1 is adapted to compress fluid into a reservoir 6 of large capacity and an electric pump governor 63 of suitable design is provided, which is controlled by the pressure of fluid compressed into the reservoir and is adapted to close the motor circuit when the pressure in the reservoir is below a predetermined degree, so that the motor is operated to cause the compressor 1 to compress fluid into the reservoir.

When the pressure in the reservoir has been increased to a predetermined degree, the governor 63 operates to open the motor circuit in the usual manner, so that the motor ceases to operate the compressor.

The reservoir 6 may be provided, if desired, with a safety valve device 7, to relieve the pressure in the reservoir, if, for any reason, the pressure should exceed a safe degree.

The fluid compressing apparatus is merely shown diagrammatically in the drawing, since equipments of this type are well known in the prior art, and are employed, for example, in connection with electric train lighting systems, except that with a lighting system, current from the batteries is employed for lighting, instead of for operating an electric motor, as in the present case.

I prefer to employ the apparatus shown, since the storage batteries provide a source of power for running the motor 60, even when the vehicle is standing, whereas with a direct driven compressor, the compressor can only operate when the vehicle is running along the track. Furthermore, an electric driven compressor will operate at a uniform speed regardless of the speed of the vehicle, while the operating speed of a direct driven compressor would vary with the speed of the vehicle.

A second storage reservoir 8 may be provided which is connected to the reservoir 6 through a pipe 9, and a pressure reducing valve device 10 may be interposed in said pipe, so that the pressure in the reservoir 8 may be maintained at a desired predetermined degree, less than the pressure in reservoir 6, according to the adjustment of the reducing valve.

The special car is equipped with the usual brake equipment comprising a triple valve device 11, connected to the brake pipe 12, an auxiliary reservoir 13, and a brake cylinder 14.

A valve device 15 is provided for regulating the supply of fluid under pressure from the reservoir 8 to the brake pipe, comprising a casing containing a flexible diaphragm 16. The chamber 17 at one side of the diaphragm 16 is connected by pipe 18 to the auxiliary reservoir 13 and chamber 19 at the opposite side of the diaphragm is connected through pipe 20 to the brake pipe 12.

A slide valve 21 is mounted in chamber 19 and is operated by a stem 22, having a follower plate 23, adapted to engage the diaphragm 16. Interposed between a wall of the valve casing and the follower plate 23 is a coil spring 24, which urges the diaphragm downwardly. A roller 25 is pressed into engagement with the valve 21 by a coil spring 26.

The valve device 15 controls the operation of a relay valve piston 27, which is mounted in a casing 28 and is subject on one side to the pressure of a coil spring 29. The chamber 30 at the spring side of the valve piston 27 is connected to a pipe 31 which leads to the seat of slide valve 21 and chamber 32 at the opposite side of the valve piston is connected to a pipe 33, leading to the seat of slide valve 21.

Chamber 32 is connected by pipe 34 to the storage reservoir 8 and the valve piston 27 controls communication from chamber 32 to a passage 35. A check valve 36, subject to the pressure of a spring 37, controls communication from passage 35 to a chamber 38, which is connected to the brake pipe 12.

Under certain conditions, the reservoir 8 may be charged from the brake pipe 12 and for controlling the charging of the reservoir from the brake pipe, a valve device 39 is provided comprising a casing containing a flexible diaphragm 40.

The valve chamber 41 at one side of the diaphragm 40 contains a slide valve 42 adapted to be operated by said diaphragm through a stem 43. A spring follower 44 subject to the pressure of a coil spring 45 engages a partition wall 46 of the casing and is provided with a stem 47 adapted to oppose movement of the diaphragm 40 toward the right.

The chamber 48, containing spring 45 is connected through pipe 49 with chamber 38 and the brake pipe 12, and valve chamber 41 is connected to the storage reservoir 8 through pipe 50. A passage 51, connected to chamber 48, has ports 52 and 53, leading to the seat of slide valve 42.

The special vehicle equipped with the above described apparatus is preferably placed in the train at an intermediate point, such for example, as illustrated in the diagram Fig. 2, representing a one hundred and fifty car train, the special car being located fifty cars from the rear end of the train.

There are several ways in which my invention will function and I will first describe a method of operation in which it will be assumed that the valve device 39 is omitted.

When the brake pipe 12 is charged with fluid under pressure, the brake equipment of the special vehicle is charged in the usual manner as are the usual brake equipments on the other cars of the train. The auxiliary reservoir 13 being thus charged with fluid under pressure, the chamber 17 is likewise charged to the same pressure, and chamber 19, being connected through pipe 20 with the brake pipe 12, is charged to brake pipe pressure, so that when the brake system is charged, the fluid pressures on opposite sides of the diaphragm 16 are equal and the spring 24 maintains the diaphragm 16 in its downward position, in which a cavity 54 in slide valve 21 connects pipe 31 with pipe 33. The opposing chambers 30 and 32 of the relay valve piston 27 are thus connected together, so that the fluid pressures on opposite sides of the valve piston are maintained equalized, permitting the spring 29 to hold the valve piston 27 in its lower seated position, in which communication from chamber 32 to passage 35 is cut off.

When the brake pipe pressure is reduced to effect an application of the brakes, the auxiliary reservoir pressure is equally reduced in the usual well known manner, so that the opposing fluid pressures of the brake pipe and auxiliary reservoir on the diaphragm 16 remains substantially balanced and consequently the spring 24 acts to maintain the slide valve 21 in the position shown in the drawing.

When the brake pipe pressure is increased to effect the release of the brakes, as soon as the brake pipe pressure is slightly higher than the reduced auxiliary reservoir pressure, say 1½ pounds, or sufficient to overcome the pressure of spring 24, the diaphragm 16 is moved upwardly, causing the slide valve 21 to be shifted to a position in which pipe 31 is connected, through cavity 54, with an atmospheric port 55. Fluid under pressure is then vented from chamber 30 of the relay valve piston 27, so that the fluid pressure in chamber 32 operates to lift the valve piston 27 and open communication from chamber 32 and the storage reservoir 8 to passage 35.

Fluid under pressure then flows from the reservoir 8, past the check valve 36 to the brake pipe 12, thus quickly supplying additional fluid under pressure to the brake pipe from the independent source of fluid under pressure on the special vehicle, at a point remote from the locomotive. The rate of brake pipe pressure increase on the cars at the rear of the train is thus accelerated, with the result that the triple valve on the cars at the rear of the train are caused to move earlier to release position.

When the auxiliary reservoir pressure has been increased to substantially brake pipe pressure, the diaphragm 16 will be moved downwardly by the spring 24, and the slide valve 21 will be shifted so as to again connect the pipes 31 and 33. Fluid pressure on opposite sides of the relay valve piston 27 then quickly equalizes, permitting the spring 29 to shift the valve piston 27 to its lower seat, thus cutting off the further flow of fluid under pressure from the reservoir 8 to the brake pipe.

The pressure of fluid maintained in the reservoir 8 may be equal to the normal brake pipe pressure, but if the reducing valve device 10 be adjusted to maintain a pressure in the reservoir 8 in excess of normal brake pipe pressure, a more rapid recharging of the brake pipe will be effected.

If, for any reason, the compressor 1 should fail, the reservoir 8 may be charged with fluid under pressure from the brake pipe and for this purpose the valve device 39 may be employed.

When the valve device 39 is employed, if the pressure in the reservoir 8 be less than the normal brake pipe pressure, due to failure of the compressor to charge the reservoir, then the higher brake pipe pressure in diaphragm chamber 56 operates to shift the diaphragm 40 and slide valve 42 toward the left, until the port 53 is uncovered by the slide valve.

Fluid under pressure is then supplied from the brake pipe through passage 51 to valve chamber 41 and thence through a restricted port 57 and pipe 50 to the reservoir 8. When the pressure in the reservoir 8 has been raised substantially to brake pipe pressure, the diaphragm 40 is moved back, assisted by spring 58, until the slide valve 42 blanks the port 53.

With the reservoir 8 thus charged with fluid under pressure from the brake pipe, when the brake pipe pressure is increased after a brake application to effect the release of the brakes, fluid under pressure is supplied from the reservoir 8 to the brake pipe, in the same manner, as hereinbefore described, where the reservoir has been charged with fluid under pressure by operation of the compressor 1.

If the brake pipe pressure should be reduced to a low degree, such that the pressure in the storage reservoir 8 exceeds the pressure of spring 45 plus the reduced brake pipe pressure, the diaphragm 40 will be shifted to the right, so that the valve 42 uncovers the port 52, thus permitting the flow of fluid from the reservoir 8 to the brake pipe.

The reservoir 8 and the reducing valve 10 might be omitted and the reservoir 6 could be directly connected to the controlling valve mechanism, although I prefer to employ the reducing valve device and the reservoir 8, so as to better ensure a constant supply of fluid at a predetermined pressure, which pressure may be adjusted to the desired point by means of the reducing valve device.

While the employment of one special car has been used as an illustration of the invention, two or more employed in the same train is intended to be within the scope of the invention.

While one illustrative embodiment of the invention has been described in detail, it is not my intention to limit its scope to that embodiment or otherwise than by the terms of the appended claims.

Having now described the invention, what is claimed as new and desired to be secured by Letters Patent, is:

1. The combination with a plurality of fluid pressure brake equipments on cars of a train including a train brake pipe and a brake controlling valve device operated upon a reduction in brake pipe pressure for effecting an application of the brakes, of an apparatus on a designated car of the train comprising a source of fluid under pressure which is charged with fluid under pressure independently of the brake pipe and means operated upon an increase in brake pipe pressure for supplying fluid from said source to the brake pipe with the brake controlling valve device in any of its operating positions.

2. In a fluid pressure train brake system, the combination with a train brake pipe, of an apparatus on one car only of the train comprising a triple valve device operated upon a reduction in brake pipe pressure for effecting an application of the brakes, a storage reservoir, means on the car for charging said reservoir with fluid under pressure accumulated independently of the brake pipe, and means operated upon an increase in brake pipe pressure for supplying fluid from said reservoir to the brake pipe independently of the triple valve device.

3. In a fluid pressure brake system applied to a train of cars including a train brake pipe, the combination on one car of the train of a triple valve device operated upon a reduction in brake pipe pressure for effecting an application of the brakes, a reservoir, a fluid compressor for supplying fluid under pressure to said reservoir, and means operated upon an increase in brake pipe pressure for supplying fluid from said reservoir to the brake pipe regardless of the position of the triple valve device.

4. A fluid pressure brake system for a train of cars comprising a train brake pipe, a fluid pressure brake apparatus on each car of the train including a triple valve device operated upon a reduction in brake pipe pressure for effecting an application of the brakes, and an additional apparatus on one car of the train comprising a reservoir, means for compressing fluid into said reservoir, and means operated upon an increase in brake pipe pressure for supplying fluid from said reservoir to the brake pipe with the triple valve device in brake applying position.

5. A fluid pressure brake system for a train of cars comprising a train brake pipe, a fluid pressure brake apparatus on each car of the train including a triple valve device operated upon a reduction in brake pipe pressure for effecting an application of the brakes, and an additional apparatus on one car of the train comprising a reservoir, means operated by the momentum of the car for compressing fluid into said reservoir and means operated upon a reduction in brake pipe pressure for supplying fluid from said reservoir to the brake pipe independently of the position of the triple valve device.

6. A fluid pressure brake system for a train of cars comprising a train brake pipe, a fluid pressure brake apparatus on each car of the train including the usual auxiliary reservoir, brake cylinder and a triple valve device operated upon a reduction in brake pipe pressure for supplying fluid from the auxiliary reservoir to the brake cylinder, and an additional apparatus on one car of the train comprising a storage reservoir, means for compressing fluid into said reservoir, and means separate from the triple valve device and subject to the opposing pressures of the brake pipe and auxiliary reservoir for controlling the supply of fluid from said storage reservoir to the brake pipe.

7. A fluid pressure brake system for a train of cars comprising a train brake pipe, a fluid pressure brake apparatus on each car of the train, and an additional apparatus on one car of the train comprising a storage reservoir, means for compressing fluid into said reservoir, means operated upon a reduction in pressure in said reservoir below the pressure in the brake pipe for supplying fluid from the brake pipe to the reservoir, and means operated upon an increase in brake pipe pressure for supplying fluid from said reservoir to the brake pipe.

8. A fluid pressure brake system for a train of cars comprising a train brake pipe, a fluid pressure brake apparatus on each car of the train including an auxiliary reservoir, and an additional apparatus on one car of the train comprising a storage reservoir, means for compressing fluid into said reservoir, means subject to the opposing pressures of said storage reservoir and the brake pipe and operated upon a reduction in pressure in the storage reservoir below the pressure in the brake pipe for supplying fluid from the brake pipe to said storage reservoir, and means subject to the opposing pressures of the auxiliary reservoir and brake pipe and operated upon an increase in brake pipe pressure above the pressure in the auxiliary reservoir for supplying fluid from said storage reservoir to the brake pipe.

9. A fluid pressure brake system for a train of cars comprising a train brake pipe, a fluid pressure brake apparatus on each car of the train including an auxiliary reservoir, and an additional apparatus on one car of the train comprising a storage reservoir, means for compressing fluid into said reservoir, means subject to the opposing pressures of said storage reservoir and the brake pipe and operated upon a reduction in pressure in the storage reservoir below the pressure in the brake pipe for supplying fluid from the brake pipe to said storage reservoir, and means subject to the opposing pressures of the auxiliary reservoir and brake pipe and operated upon a predetermined increase in brake pipe pressure above the pressure in the auxiliary reservoir for supplying fluid from said storage reservoir to the brake pipe.

HENRY H. WESTINGHOUSE.